US012591317B2

(12) United States Patent (10) Patent No.: US 12,591,317 B2
Chen et al. (45) Date of Patent: Mar. 31, 2026

(54) INPUT INTERFACE CONTROLLING METHOD AND SYSTEM THEREOF

(71) Applicant: Wistron NeWeb Corporation, Hsinchu (TW)

(72) Inventors: Chao-Tsu Chen, Hsinchu (TW); Jia Hung Su, Hsinchu (TW); Jen Chao Lu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 18/885,840

(22) Filed: Sep. 16, 2024

(65) Prior Publication Data

US 2025/0348154 A1      Nov. 13, 2025

(30) Foreign Application Priority Data

May 7, 2024      (TW) ................................. 113116757

(51) Int. Cl.
| | |
|---|---|
| *G06F 3/03* | (2006.01) |
| *G01S 13/00* | (2006.01) |
| *G01S 13/86* | (2006.01) |
| *G06F 3/01* | (2006.01) |
| *G06T 7/521* | (2017.01) |
| *G06T 7/55* | (2017.01) |

(52) U.S. Cl.
CPC .......... *G06F 3/0325* (2013.01); *G01S 13/003* (2013.01); *G01S 13/867* (2013.01); *G06F 3/017* (2013.01); *G06T 7/521* (2017.01); *G06T*

7/55 (2017.01); *G06T 2207/10028* (2013.01); *G06T 2207/30196* (2013.01)

(58) Field of Classification Search
CPC ......... G06F 3/0325; G06F 3/017; G06T 7/55; G06T 7/521; G06T 2207/10028; G06T 2207/30196; G01S 13/003; G01S 13/867
USPC ........................................................ 345/158
See application file for complete search history.

(56) References Cited

U.S. PATENT DOCUMENTS

| | | | |
|---|---|---|---|
| 2021/0311180 A1 | 10/2021 | Wang et al. | |
| 2021/0406560 A1* | 12/2021 | Park ...................... G01S 13/867 |
| 2022/0253098 A1* | 8/2022 | Berliner ................. G06F 3/012 |
| 2024/0256049 A1* | 8/2024 | Krivoruchko ....... G06F 3/04812 |

FOREIGN PATENT DOCUMENTS

| | | |
|---|---|---|
| CN | 116931729 A | 10/2023 |
| EP | 4083757 A1 | 11/2022 |
| TW | 202319887 A | 5/2023 |

* cited by examiner

*Primary Examiner* — Mark Edwards
(74) *Attorney, Agent, or Firm* — McClure, Qualey & Rodack, LLP

(57)      ABSTRACT

An input interface controlling method includes: transmitting a transmitting wave toward an identification space by a radar unit; receiving a reflected wave by the radar unit and obtaining a radar point cloud; capturing a captured image of the identification space by a camera unit; and identifying a target point from the radar point cloud and the captured image, and a target position of the target point being used as an input interface.

18 Claims, 6 Drawing Sheets

INPUT INTERFACE CONTROLLING METHOD AND SYSTEM THEREOF

RELATED APPLICATIONS

This application claims the benefit of priority to Taiwan Patent Application No. 113116757, filed on May 7, 2024. The entire content of the above identified application is incorporated herein by reference.

BACKGROUND

Technical Field

The present disclosure relates to an input interface controlling method and a system thereof, in particular to an input interface controlling method and a system thereof using a radar unit and a camera unit.

Description of Related Art

As working from home and remote learning become more common, the demand for portable electronic devices in the market has significantly increased. However, the additional peripherals and control interfaces (such as mice) for portable electronic devices still have inconveniences in terms of portability and usage.

Furthermore, there are various input control interfaces available in the market that replace the mice, such as touchpads, track points, track sticks, and visual virtual mice, but they still have limitations and drawbacks. Touchpads and track points need to be used within a specific small area, and long-term use can cause strain on the wrist. Visual virtual mice require an additional image recognition device to be placed in front or behind the user and require specific gestures to assist, which adds another burden for the user to learn the related operational rules.

In view of this, there is an urgent need to develop an input interface controlling method and a system thereof that are convenient, accurate, reduce physical strain, and increase the willingness to use in the current market for input control interfaces of portable electronic devices.

SUMMARY

According to one aspect of the present disclosure, an input interface controlling method is provided, including: transmitting a transmitting wave toward an identification space by a radar unit; receiving a reflected wave by the radar unit and obtaining a radar point cloud; capturing a captured image of the identification space by a camera unit; and identifying a target point from the radar point cloud and the captured image, and the target position of the target point being used as an input interface.

According to another aspect of the present disclosure, an input interface controlling system is provided, including at least one control unit, a radar unit, and a camera unit. The at least one control unit includes at least one processor and at least one storage medium, and the storage medium includes an input interface controlling module. The radar unit is communicatively connected to the at least one control unit. The camera unit is communicatively connected to the at least one control unit. Based on the input interface controlling module, the at least one control unit is configured to: transmit a transmitting wave toward an identification space by the radar unit; receive a reflected wave by the radar unit and obtain a radar point cloud; capture a captured image of the identification space by the camera unit; and identify a target point from the radar point cloud and the captured image. The target position of the target point is used as an input interface.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
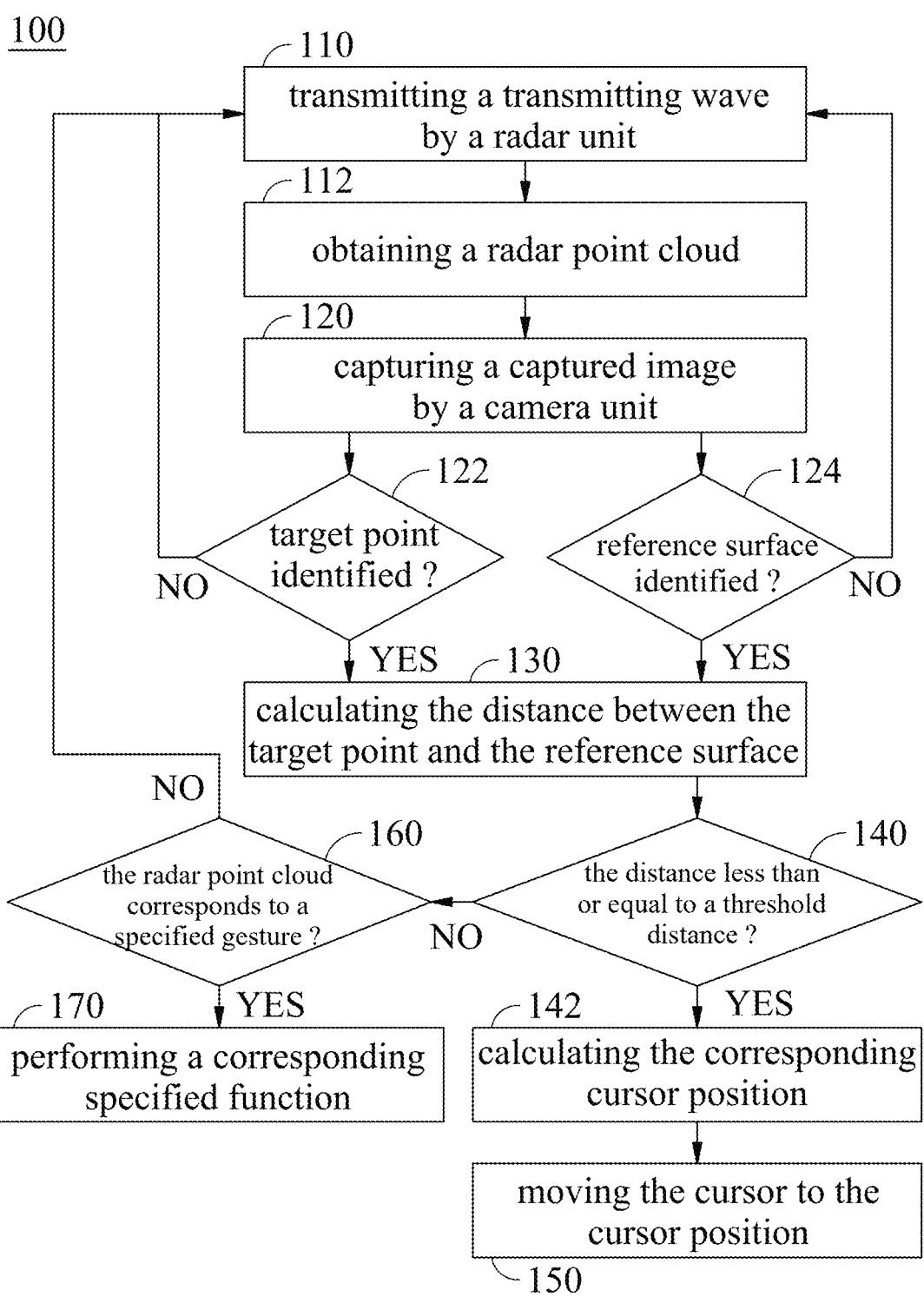
FIG. 1 illustrates a flowchart of an input interface controlling method according to a first embodiment of the present disclosure.

The present disclosure is more particularly described in the following embodiments that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an" and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2A:
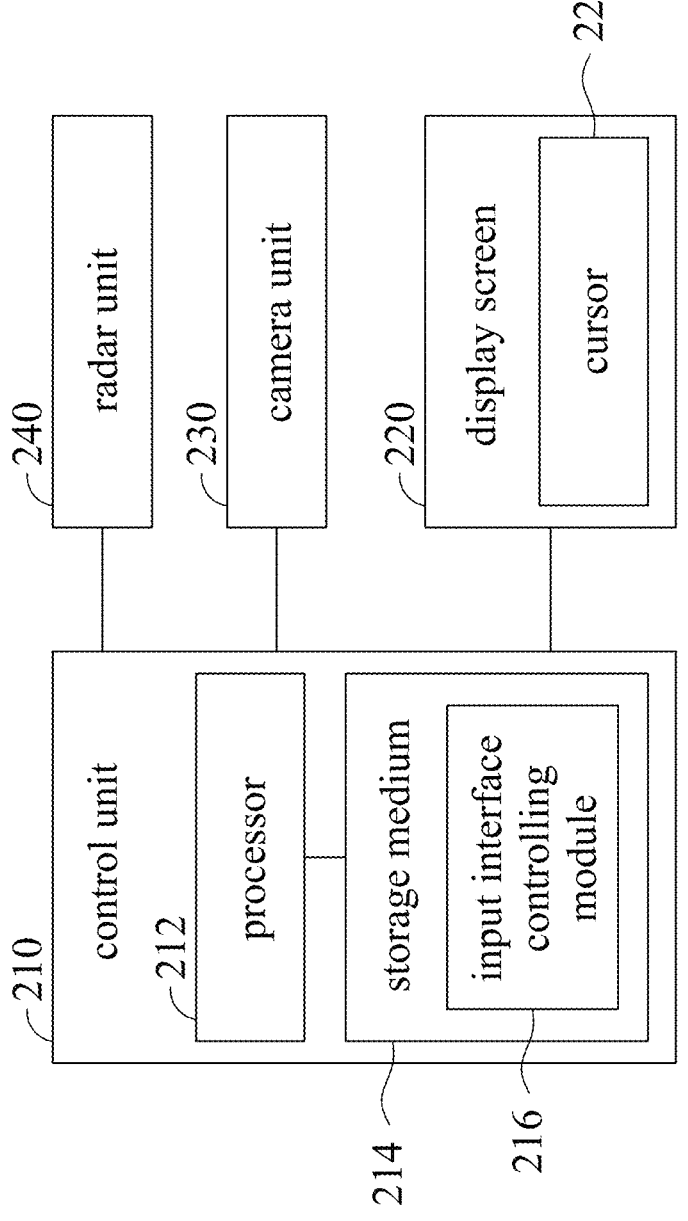
FIG. 2A illustrates a block diagram of an input interface controlling system according to a second embodiment of the present disclosure.
Figure 2B:
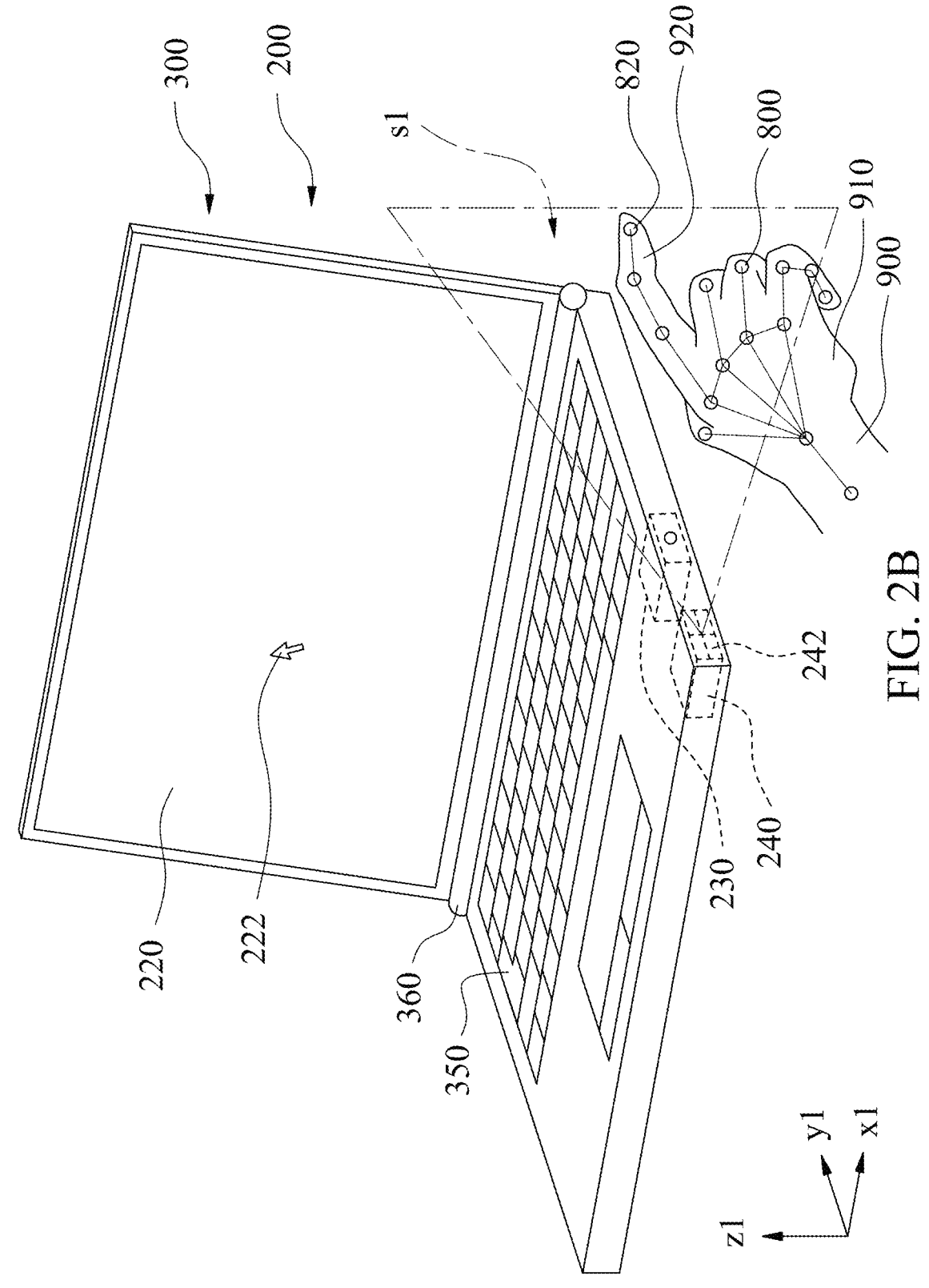
FIG. 2B illustrates a schematic diagram of the usage status of the input interface controlling system in FIG. 2A.

FIG. 1 illustrates a flowchart of an input interface controlling method 100 according to a first embodiment of the present disclosure. FIG. 2A illustrates a block diagram of an input interface controlling system 200 according to a second embodiment of the present disclosure. FIG. 2B illustrates a schematic diagram of the usage status of the input interface controlling system 200 in FIG. 2A. Referring to FIG. 1, FIG. 2A, and FIG. 2B, the present disclosure uses the input interface controlling method 100 of the first embodiment and the input interface controlling system 200 of the second embodiment to assist each other. It should be understood that the embodiment of the input interface controlling method 100 of the present disclosure is not limited to the input interface controlling system 200, and the embodiment of the input interface controlling system 200 of the present disclosure is not limited to using the input interface controlling method 100.

The input interface controlling method 100 of the first embodiment includes steps 110, 112, 120, 122. The step 110 includes transmitting a transmitting wave toward the identification space s1 by the radar unit 240. The step 112 includes receiving a reflected wave by the radar unit 240 and obtaining a radar point cloud 800. The step 120 includes capturing a captured image of the identification space s1 by the camera unit 230. The step 122 includes identifying a target point 820 from the radar point cloud 800 and the captured image, and the target position of the target point 820 is used as an input interface. Thus, the input interface controlling method 100 combines the high precision and high stability advantages of visual recognition with the multi-directionality and high-speed movement advantages of radar, compensating for the shortcomings of using either alone and thereby improving the accuracy of the input interface.

The input interface controlling system 200 of the second embodiment includes at least one control unit 210, the radar unit 240, and the camera unit 230. The control unit 210 includes at least one processor 212 and at least one storage medium 214, and the storage medium 214 includes an input interface controlling module 216. Specifically, the storage medium 214 is a non-transitory computer-readable storage medium, and the input interface controlling module 216 is a program code. The radar unit 240 is communicatively connected to the control unit 210, and the camera unit 230 is communicatively connected to the control unit 210. Based on the input interface controlling module 216, the control unit 210 is configured to perform steps 110, 112, 120, 122 of the input interface controlling method 100. Therefore, by converging the point cloud data generated by random radar reflections through high-precision visual recognition of single points and resolving the issue of visual recognition being limited to a single plane through the multi-directionality of radar, the input interface's accuracy and recognition efficiency are improved.

Specifically, the steps 110, 112 can be performed earlier than the step 120, that is, obtaining the radar point cloud 800 can be done before capturing the captured image. Thus, from the signals of the received radar reflected waves, the control unit 210 obtains multiple radar measurement points and processes the data of the radar measurement points with the final frame image captured by the camera unit 230 to obtain the required radar point data. In other words, the input interface controlling system 200 combines three-dimensional point cloud data and two-dimensional image data, using the image data to determine the position of the fingertip as a single point to overlap and converge the radar point cloud data, thereby increasing the accuracy of the target point 820 in the three-dimensional radar detection space. When the input interface controlling system 200 replaces the mouse, it makes the trajectory and direction of the cursor 222 smoother. According to other embodiments of the present disclosure, obtaining the radar point cloud can be done simultaneously with or later than capturing the captured image.

Figure 2C:
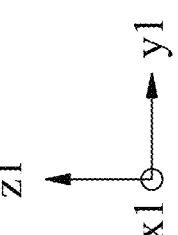
FIG. 2C illustrates another schematic diagram of the usage status of the input interface controlling system in FIG. 2A.
Figure 2C:
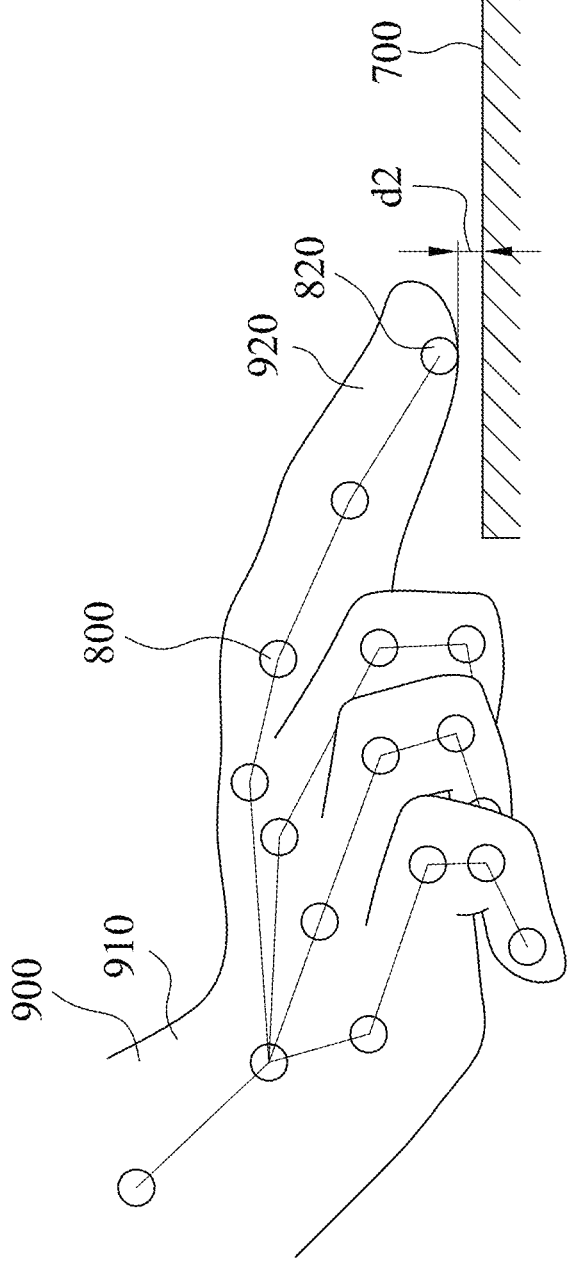

FIG. 2C illustrates another schematic diagram of the usage status of the input interface controlling system 200 in FIG. 2A. Referring to FIG. 1 and FIG. 2A to FIG. 2C, the input interface controlling method 100 may further include steps 124, 130. The step 124 includes identifying a reference surface 700 from the radar point cloud 800 and the captured image. The step 130 includes calculating the distance d2 between the target point 820 and the reference surface 700. Thus, the input interface controlling method 100 can accurately obtain the required radar point data, and then determine through calculation whether the target point 820 is on the reference surface 700. In addition, it should be understood that FIG. 2B and FIG. 2C are schematic diagrams of the radar point cloud 800 obtained by combining the actual physical configuration with the radar unit 240 and the control unit 210.

Specifically, when the target point 820 has been already identified from the radar point cloud 800 and the captured image in the step 122, and the reference surface 700 has been already identified from the radar point cloud 800 and the captured image in the step 124, the step 130 is performed to calculate the distance d2 between the target point 820 and the reference surface 700. Conversely, if the steps 122, 124 fail to identify at least one of the target point 820 and the reference surface 700 from the radar point cloud 800 and the captured image, the steps 110, 112, 120, 122, 124 are repeated until the target point 820 and the reference surface 700 being successfully identified from the radar point cloud 800 and the captured image in the steps 122, 124.

The input interface controlling method 100 may further include steps 140, 142, 150. The input interface controlling system 200 may further include a display screen 220, which is communicatively connected to the control unit 210. The step 140 includes determining whether the distance d2 is less than or equal to a threshold distance. The step 142 includes calculating the cursor position on the display screen 220 of the electronic device 300 corresponding to the target position when the distance d2 is less than or equal to the threshold distance. The step 150 includes moving the cursor 222 on the display screen 220 to the cursor position. Thus, the actual point cloud data is prone to excessive dispersion due to the influence of the environment and object movement, and its accuracy is limited even with calculations and convergence. The input interface controlling method 100 aids recognition by capturing the captured image after obtaining the radar point cloud 800, converting the three-dimensional radar signals into the two-dimensional plane signals, and converting the two-dimensional plane signals into the cursor position on the display screen 220. The system is advantageous in calculating the movement amount, thereby operating the cursor 222 to move on the display screen 220, and can improve the recognition accuracy of the target point 820 to within 0.5 cm, so as to effectively replace the mouse.

The radar point cloud 800 may include the point cloud of the hand 910 of the user 900, and the captured image may include the image of the hand 910. The target point 820 may be the fingertip of the finger 920 of the hand 910. Thus, this helps to improve the willingness to use and the convenience of the input interface controlling system 200.

The reference surface 700 may be an operation surface, a supporting surface, or a contact surface, such as a desktop (a surface of a desk). The threshold distance may be between 0.5 cm and 7 cm. Thus, the position of the finger 920 is identified by superimposing the radar reflected wave signals and the image, and only the radar reflected wave signals within a specific range on the fingertip of the finger 920 is used as the basis for moving the cursor 222. This effectively uses the image range to reduce the three-dimensional reflected wave error caused by the environment, movement, speed, etc., for example, reducing the position error from being greater than 2 cm to 0.5 cm, thereby increasing accuracy and accurately determining whether the fingertip has left the operation surface.

The input interface controlling method 100 may further include step 160. The step 160 includes determining whether the radar point cloud 800 corresponds to a specified gesture when the distance d2 is greater than the threshold distance, i.e., when the distance d2 does not satisfy being less than or equal to the threshold distance. This helps the input interface controlling system 200 to integrate more input control functions.

The input interface controlling method 100 may further include step 170. The step 170 includes causing the electronic device 300 to perform a corresponding specified function according to the specified gesture when it is determined that the radar point cloud 800 corresponds to the specified gesture. Thus, the input interface controlling system 200 can have multiple input control functions and usability. Furthermore, if the step 170 fails to determine that the radar point cloud 800 corresponds to a specified gesture, the steps 110, 112, 120, 122, 124 are repeated.

The specified function may be equivalent to one of the mouse's scroll wheel function, left-click function, and right-click function. Thus, when the radar wave detects that the target point 820 (fingertip) leaves the reference surface 700 (operation surface), the input interface controlling system 200 can start to determine the gesture of the user 900 corresponding to the button or scroll wheel function. The gesture can be an up-and-down tap, a left-and-right wave, etc., and the scroll wheel function can be replaced by drawing a circle with the finger 920 in a clockwise or counterclockwise direction.

The input interface controlling system 200 can be disposed in the electronic device 300, specifically as a notebook computer in FIG. 2B, which includes a keyboard 350. The keyboard 350 is communicatively connected to the control unit 210. The radar unit 240 and the keyboard 350 can be arranged along the first direction x1, and the radar unit 240 and the camera unit 230 can be arranged along the second direction y1, facing the identification space s1, and the second direction y1 is configured to be parallel to the extension direction of the finger 920. Thus, the input interface controlling system 200 according to the present disclosure has the advantage of miniaturization and can be built into existing portable electronic devices, such as the radar unit 240 and the camera unit 230 being set adjacent to the keyboard 350 on the side of the notebook computer.

The electronic device 300 may further include a hinge 360, which is specifically parallel to the first direction x1 in FIG. 2B. The radar unit 240 and the camera unit 230 may be disposed adjacent to and on one end of two ends of the keyboard 350 parallel to the hinge 360 of the notebook computer (i.e., the positive or negative direction end of the first direction x1 in FIG. 2B). Thus, the radar reflection wave data and the image data can be effectively overlapped, and data not within a specific range of the fingertip of the finger 920 (e.g., 0.5 cm) is not used, so as to reduce the error caused by radar reflection waves, make the movement of the cursor 222 smoother and not overly change the original habit of using a mouse, thereby increasing the willingness to use.

Additionally, the radar unit and the camera unit of the input interface controlling system according to the present disclosure may be a single device not built into the electronic device such as the notebook computer, which can be communicatively connected to the notebook computer via wired or wireless means, such as a single device communicatively connected to the notebook computer via a USB interface, and the electronic device according to the present disclosure is not limited to the notebook computer. Furthermore, the radar unit and the camera unit of the input interface controlling system according to the present disclosure may also be set on the side of the keyboard facing the user, or the frame of the display screen, and the present disclosure is not limited thereto.

Figure 2D:
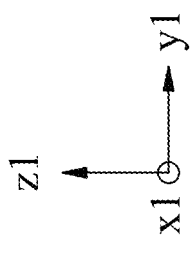
FIG. 2D illustrates a schematic diagram of an antenna configuration of a radar unit of the input interface controlling system in FIG. 2A.
Figure 2D:
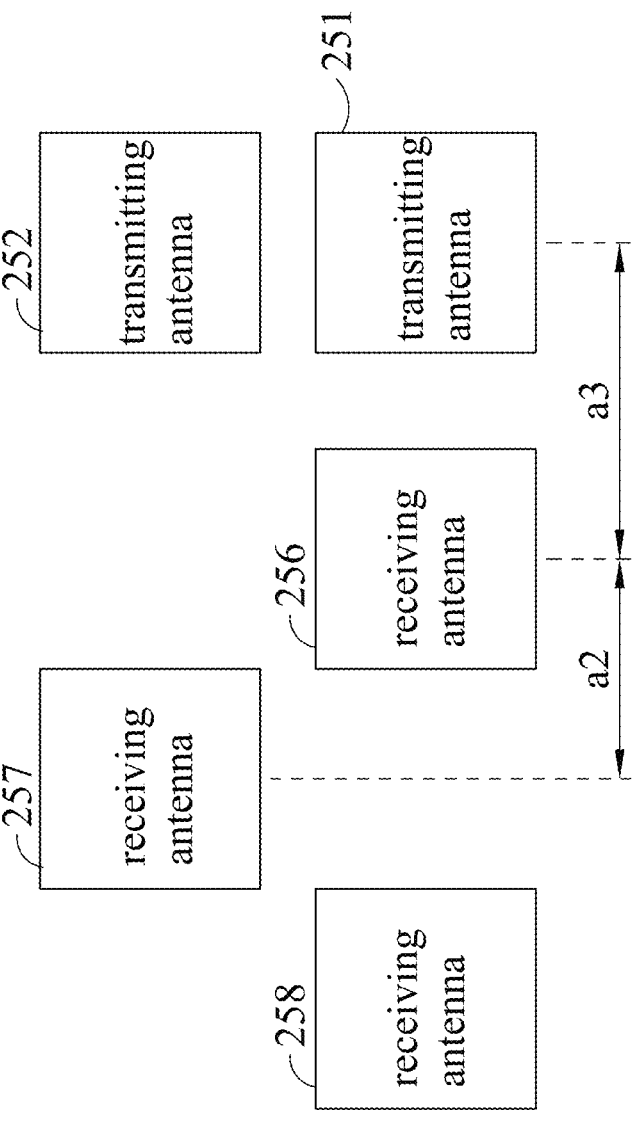

FIG. 2D illustrates a schematic diagram of an antenna configuration of the radar unit 240 of the input interface controlling system 200 in FIG. 2A. Referring to FIG. 2B and FIG. 2D, the radar unit 240 may include at least one transmitting antenna and at least three receiving antennas. The antenna configuration in the radar unit 240 may be as shown in FIG. 2D, and the radar unit 240 includes two transmitting antennas and three receiving antennas, namely, transmitting antennas 251, 252 and receiving antennas 256, 257, 258. The transmitting antennas 251, 252 are configured to transmit the transmitting waves, and the receiving antennas 256, 257, 258 are configured to receive the reflected waves. The transmitting antennas 251, 252 and the receiving antennas 256, 257, 258 are arranged on the antenna plane 242, and the normal direction of the antenna plane 242 is parallel to the first direction x1. The receiving antennas 256, 258 are arranged and aligned along the second direction y1, and the first direction x1 and the second direction y1 are perpendicular to each other. This arrangement improves radar resolution and usability.

Referring to FIG. 2D, the operating frequency of the radar unit 240 corresponds to a wavelength $\lambda$, and the wavelength $\lambda$ can be less than 5 mm. Furthermore, the radar unit 240 may be a millimeter-wave radar unit. The center-to-center distance a2 of the projection positions of the receiving antennas 256, 257 in the second direction y1 can satisfy the following condition: $0.25 \times \lambda \leq a2 \leq 0.5 \times \lambda$. This improves sensing accuracy and meets miniaturization requirements. Furthermore, the center-to-center distance of the projection positions of the receiving antennas 257, 258 in the second direction y1 can be equal to the aforementioned center-to-center distance a2.

In the second direction y1, the closest two among the transmitting antennas 251, 252 and the receiving antennas 256, 257, 258 are the transmitting antenna 251 and the receiving antenna 256. The center-to-center distance a3 of the projection positions of the transmitting antenna 251 and the receiving antenna 256 in the second direction y1, which is the center-to-center distance a3 of the projection positions of the transmitting antenna 251 and the closest receiving antenna 256 among the receiving antennas 256, 257, 258 in the second direction y1, satisfies the following condition: $a2 \leq a3$. This meets sensing accuracy requirements and provides design flexibility.

Two of the receiving antennas 256, 257, 258 (e.g., receiving antennas 256, 257) may have different projection positions in the third direction z1, and the first direction x1, the second direction y1, and the third direction z1 are perpendicular to each other. Thus, the receiving antennas 256, 257 are misaligned in the third direction z1, and the receiving antennas 257, 258 are also misaligned in the third direction z1, thereby obtaining radar information in the third axis (i.e., the third direction z1) and improving the accuracy of the three-dimensional point cloud data.

Figure 2E:
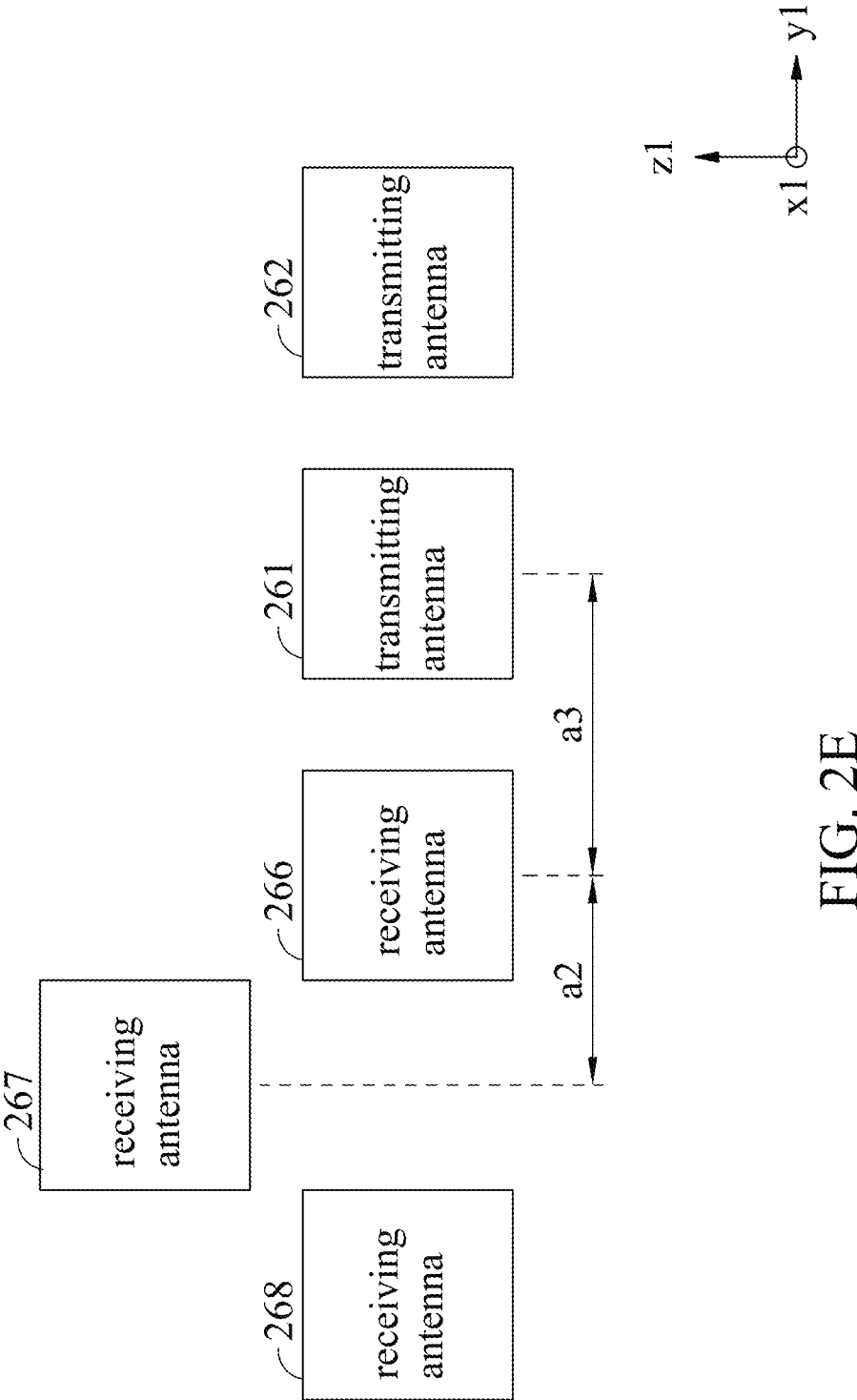
FIG. 2E illustrates a schematic diagram of another antenna configuration of the radar unit of the input interface controlling system in FIG. 2A.

FIG. 2E illustrates a schematic diagram of another antenna configuration of the radar unit 240 of the input interface controlling system 200 in FIG. 2A. Referring to FIG. 2B and FIG. 2E, the antenna configuration of the radar unit 240 may also be as shown in FIG. 2E, and the radar unit 240 includes transmitting antennas 261, 262 and receiving antennas 266, 267, 268. Other related details can be referred to the description of the transmitting antennas 251, 252 and the receiving antennas 256, 257, 258 in FIG. 2D, and the antenna configuration of the radar unit of the present disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An input interface controlling method, comprising:
transmitting a transmitting wave toward an identification space by a radar unit;
receiving a reflected wave by the radar unit and obtaining a radar point cloud;
capturing a captured image of the identification space by a camera unit after obtaining the radar point cloud; and
identifying a target point from the radar point cloud and the captured image, wherein a target position of the target point is used as an input interface;
wherein the radar unit comprises at least one transmitting antenna and at least three receiving antennas, the at least one transmitting antenna is configured to transmit the transmitting wave, the at least three receiving antennas are configured to receive the reflected wave, the at least one transmitting antenna and the at least three receiving antennas are arranged on an antenna plane, a normal direction of the antenna plane is parallel to a first direction, two of the at least three receiving antennas are arranged and aligned along a second direction, and the first direction and the second direction are perpendicular to each other.

2. The input interface controlling method according to claim 1, further comprising:
identifying a reference surface from the radar point cloud and the captured image; and
calculating a distance between the target point and the reference surface.

3. The input interface controlling method according to claim 2, further comprising:
calculating a cursor position on a display screen of an electronic device corresponding to the target position when the distance is less than or equal to a threshold distance; and
moving a cursor on the display screen to the cursor position.

4. The input interface controlling method according to claim 3, wherein the reference surface is a supporting surface, and the threshold distance is between 0.5 cm and 7 cm.

5. The input interface controlling method according to claim 2, wherein the radar point cloud comprises a point cloud of a hand of a user, the captured image comprises an image of the hand, and the target point is a fingertip of a finger of the hand.

6. The input interface controlling method according to claim 5, further comprising:
determining whether the radar point cloud corresponds to a specified gesture when the distance is greater than a threshold distance.

7. The input interface controlling method according to claim 6, further comprising:
causing an electronic device to perform a specified function corresponding to the specified gesture when it is determined that the radar point cloud corresponds to the specified gesture.

8. The input interface controlling method according to claim 7, wherein the specified function is equivalent to one of a scroll wheel function, a left-click function, and a right-click function of a mouse.

9. An input interface controlling system, comprising:
at least one control unit comprising at least one processor and at least one storage medium, wherein the storage medium comprises an input interface controlling module;
a radar unit communicatively connected to the at least one control unit; and
a camera unit communicatively connected to the at least one control unit;
wherein based on the input interface controlling module, the at least one control unit is configured to:
transmit a transmitting wave toward an identification space by the radar unit;
receive a reflected wave by the radar unit and obtain a radar point cloud;
capture a captured image of the identification space by the camera unit after obtaining the radar point cloud; and
identify a target point from the radar point cloud and the captured image, wherein a target position of the target point is used as an input interface;
wherein the radar unit comprises at least one transmitting antenna and at least three receiving antennas, the at least one transmitting antenna is configured to transmit the transmitting wave, the at least three receiving antennas are configured to receive the reflected wave, the at least one transmitting antenna and the at least three receiving antennas are arranged on an antenna plane, a normal direction of the antenna plane is parallel to a first direction, two of the at least three receiving antennas are arranged and aligned along a second direction, and the first direction and the second direction are perpendicular to each other.

10. The input interface controlling system according to claim 9, wherein based on the input interface controlling module, the at least one control unit is further configured to:
identify a reference surface from the radar point cloud and the captured image; and
calculate a distance between the target point and the reference surface.

11. The input interface controlling system according to claim 10, further comprising:
a display screen communicatively connected to the at least one control unit;
wherein based on the input interface controlling module, the at least one control unit is further configured to:

calculate a cursor position on the display screen corresponding to the target position when the distance is less than or equal to a threshold distance; and move a cursor on the display screen to the cursor position.

12. The input interface controlling system according to claim 11, wherein the reference surface is a supporting surface, and the threshold distance is between 0.5 cm and 7 cm.

13. The input interface controlling system according to claim 10, wherein the radar point cloud comprises a point cloud of a hand of a user, the captured image comprises an image of the hand, and the target point is a fingertip of a finger of the hand.

14. The input interface controlling system according to claim 13, wherein an operating frequency of the radar unit corresponds to a wavelength $\lambda$, the wavelength $\lambda$ is less than 5 mm, and a center-to-center distance a2 of projection positions of two of the at least three receiving antennas in the second direction satisfies the following condition:

$$0.25 \times \lambda \leq a2 \leq 0.5 \times \lambda.$$

15. The input interface controlling system according to claim 14, wherein a center-to-center distance a3 of the projection positions of the at least one transmitting antenna and the closest one of the at least three receiving antennas in the second direction satisfies the following condition: a2≤a3.

16. The input interface controlling system according to claim 13, wherein two of the at least three receiving antennas have different projection positions in a third direction, and the first direction, the second direction, and the third direction are perpendicular to each other.

17. The input interface controlling system according to claim 13, wherein the input interface controlling system is disposed in a notebook computer, the notebook computer comprises a keyboard communicatively connected to the at least one control unit;

wherein the radar unit and the keyboard are arranged along the first direction, the radar unit and the camera unit are arranged along the second direction and face the identification space, and the second direction is configured to be parallel to an extension direction of the finger.

18. The input interface controlling system according to claim 9, wherein the input interface controlling system is disposed in a notebook computer, the notebook computer comprises a hinge, and the radar unit and the camera unit are disposed adjacent to and on one end of two ends of a keyboard parallel to the hinge of the notebook computer.

* * * * *